United States Patent [19]

Kazumi et al.

[11] Patent Number: 4,664,491

[45] Date of Patent: May 12, 1987

[54] PHOTOGRAPHIC DATA EXPOSURE DEVICE

[75] Inventors: Jiro Kazumi, Kawasaki; Masaaki Ishihara, Yokohama, both of Japan

[73] Assignee: Canon Kabushiki Kaisha, Tokyo, Japan

[21] Appl. No.: 883,747

[22] Filed: Jul. 9, 1986

[30] Foreign Application Priority Data

Jul. 12, 1985 [JP] Japan .................................. 60-153599

[51] Int. Cl.⁴ ............................................. G03B 17/24
[52] U.S. Cl. ............................... 354/105; 354/173.11; 354/266
[58] Field of Search ................. 354/105–109, 354/173.11, 266, 267.1

[56] References Cited

U.S. PATENT DOCUMENTS

| | | | |
|---|---|---|---|
| 4,232,956 | 11/1980 | Hashimoto et al. | 354/106 |
| 4,344,682 | 8/1982 | Hattori | 354/106 |
| 4,470,677 | 9/1984 | Tsujimoto et al. | 354/106 |
| 4,588,274 | 5/1986 | Kazumi | 354/105 |

*Primary Examiner*—Russell E. Adams
*Attorney, Agent, or Firm*—Fitzpatrick, Cella, Harper & Scinto

[57] ABSTRACT

A photographic camera is equipped with data recording means which is controlled to record data onto a film after a picture taking operation is completed following release of a trigger on the camera.

9 Claims, 4 Drawing Figures

PHOTOGRAPHIC DATA EXPOSURE DEVICE

BACKGROUND OF THE INVENTION

1. Field of the Invention

The present invention relates to a photographic camera and more particularly to a data exposure device which is adapted for recording on a photographic film shooting data together with a picture on the film.

2. Description of the Prior Art

A data recording device is used, for example, in cameras, for the purpose of exposing photographic film in the camera to light images which indicate shooting data such as the date and time of the shot, aperture value, shutter speed, and so forth. Amongst various types of data recording device, a device known as "data back" is adapted to be fitted on the rear of a camera, after removing the rear cover of the camera. This type of data recording device has a light source means such as lamps or LEDs which are adapted to be lit to form a light image of the shooting data in response to a signal from a camera, e.g., a shutter release start signal, a front curtain travel completion signal or an exposure completion signal.

The duration of lighting of the data image light source is determined beforehand in a control circuit to effect optimum exposure on the photographic film, taking into account various factors such as the sensitivity of the film.

Usually, due to the small lighting power of the light source, the lighting time is considerably longer than the shooting exposure time for picture taking. This causes a problem when the camera is operated for continuous shooting by a motor drive unit which is arranged to drive the camera wind-up system in response to an exposure completion signal derived in the camera. Thus, when the camera is equipped both with a data back and a motor drive for continuous shooting, there is a possibility that the motor drive unit may wind up the camera and advance the film before the data recording is completed. If the film is advanced during the data recording, the data image being recorded on the film will be moved undesirably. This problem is serious and continuous shooting is substantially impossible particularly when the film has a low or slow sensitivity because such a film requires a longer time for the data light exposure.

In order to overcome this problem, a camera has been proposed in which both a winding start signal and a data recording trigger signal are produced upon completion of the exposure and, at the same time, a winding prohibition signal is given to the motor drive unit until the data recording is completed. The motor drive unit starts the camera wind-up only after the winding prohibition signal is cancelled following completion of the data recording.

This camera, however, encounters a problem in that the camera cannot perform high-speed continuous shooting when the data recording device is used, because it operates in such a sequence that winding is possible only after the data recording is completed.

In order to enable a camera with data exposure function to perform high-speed continuous shot, U.S. Pat. No. 4,470,677 proposes a data exposure device which is adapted for effecting data exposure only on the first frame of the continuous frames of the film in each continuous shot.

This data exposure device, however, has problems due to the fact that the high-speed continuous shooting is usually conducted for a specific purpose in which a regular time interval between successive frames is essential, as in the case of sports photography or scientific photography. Namely, in the case of the above-mentioned U.S. Pat. No. 4,470,677, the timing of shutter release for the second frame must be delayed due to the necessity of sufficient time for the data to be recorded on the first frame. In consequence, the shutter release opportunity for the second frame may be lost and the time interval between the shots on the first and the second frame is longer than the time interval between other successive frames.

SUMMARY OF THE INVENTION

Accoding to one aspect of the invention, there is provided a camera for recording picture images and data images on a film which comprises first recording means, second recording means, manually operable trigger means, and control means. The first recording means is arranged to record a picture image on a selected part of the film. The second recording means is arranged to record a data image on a portion of the film. The control means is responsive to the trigger means for controlling the first and the second recording means. The control means is arranged to cause operation of the first recording means and to prevent operation of the first recording means while the trigger means is operated.

In the preferred embodiment, the data recording means is arranged to record the data on the film portion exposed for picture taking in each operation of the trigger means. Also, the data recording means may include a data light generator for causing the film to be exposed to data light.

The above and other aspects, features and advantages of the invention will become clear from the following description of the preferred embodiment taken in conjunction with the accompanying drawings.

DESCRIPTION OF THE PREFERRED EMBODIMENT

Figure 1:
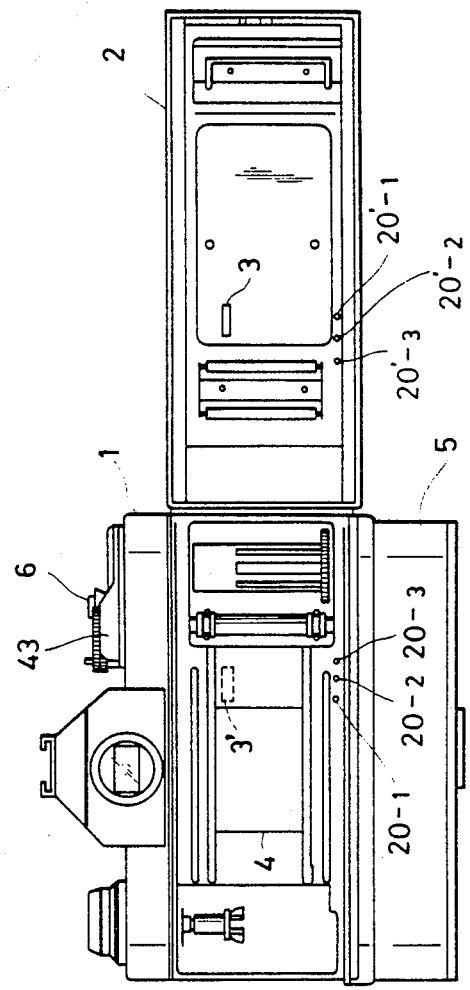
FIG. 1 is a rear elevational view of a camera with its cover opened and incorporating a data recording device in accordance with the invention.

Referring to FIG. 1, a data recording device 2 in accordance with the invention is mounted in the rear cover of a camera 1. The data recording device 2 has a data registering section 3 for projecting a data image on the portion 3' of the film out of the area of the camera aperture 4 which is opened and closed by shutter curtains in the normal manner. It will be noted that the location of the portion 3' is such that the data image is recorded on the film frame after it has been advanced past the aperture 4. Numerals 20-1, 20-2 and 20-3 and 20'-1, 20'-2 and 20'-3 denote electrical contacts on the camera 1 and its cover through which the data recording device 2 is electrically connected to the electric circuit in the camera 1. An automatic wind-up unit 5 is provided for winding up the camera 1.

Figure 2:
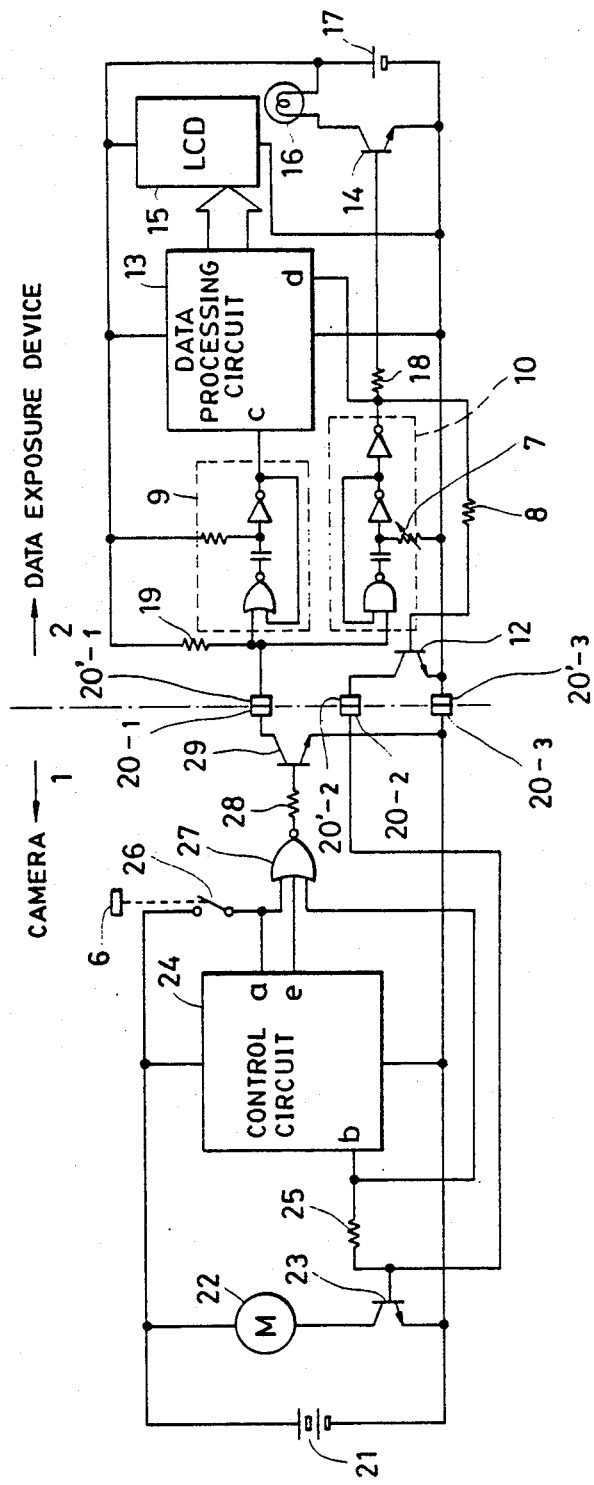
FIG. 2 is a circuit diagram illustrating a constructions of a camera circuit and a data recording circuit according to the invention and used with the camera of FIG. 1.

Referring now to FIG. 2, an electric circuit for the camera and for the data recording includes an electrical power supply 21, a camera windup drive motor 22 and a transistor 23 for controlling actuation of the motor 22. The transistor 23 has a base which is connected to the output b of a control circuit 24 through a resistor 25. The control circuit 24 is arranged to control shutter release and exposure operations when the level of its input a is changed to high (hereinafter "H") as a trigger switch 26 is closed in response to depression of a shutter release button 6 (FIG. 1) on the camera, and to maintain its output b at "H" level until the winding is completed, so that the releasing and winding operations are conducted repeatedly upon detection of the completion of winding, as long as the switch 26 is in the "on" state, i.e., as long as the shutter release button 6 is in the depressed position. The control circuit 24 is also adapted to maintain its output e at "H" level during the release and exposure. A NOR gate 27 is adapted to produce an output of low (hereinafter "L") level when any one of the input a, output b and output e takes the "H" level, so as to turn a transistor 29 off. The transistor 29 has a collector connected to the contact 20-1.

An electric circuit for data recording includes monostable multivibrators 9 and 10 the inputs of which are commonly connected to the contact 20-1. The monostable multivibrator 9 is arranged to produce a pulse of "H" level for a predetermined time when the potential of the contact 20-1 is changed from "L" to "H", whereas the monostable multivibrator 10 is arranged to produce a pulse of "H" level for a predetermined time necessary for the data recording, when the potential of the contact 20-1 is changed from "H" to "L". The output of the monostable multivibrator 9 is connected to an input c of a data processing circuit 13 which drives a data exposure LCD (Liquid Crystal Displayer) 15. On the other hand, the output of the monostable multivibrator 10 is connected to an input d of the processing circuit 13 and to bases of the transistors 12 and 14 through resistors 8 and 18, respectively. The time constant of the multivibrator 10 is adjustable through a variable resistor 7. The collector of the transistor 14 is connected to a lamp 16; and the collector of the transistor 12 is connected to the contact 20-2, which in turn is connected to the base of the transistor 23.

A data processing circuit 13 includes both a data processing portion and an LCD driving portion. The data processing circuit 13 also includes an electronic clock circuit which counts time intervals to generate time data such as date and time, as well as a data input circuit which is capable of inputting data through operation of an external operation member which is not shown. The data processing circuit 13 is further arranged to latch the data obtained therein when the level of the input signal to the input c is changed from "L" to "H", and to unlatch the data when the level of the signal inputted to the input d is changed from "H" level to "L" level. The display generated by the LCD 15 is illuminated by the lamp 16 as the light emitting element, so that the data on the LCD 15 is recorded in the photographic film which is not shown. The LCD 15 constitutes the data registering section 3 explained before in connection with FIG. 1.

Figure 4:
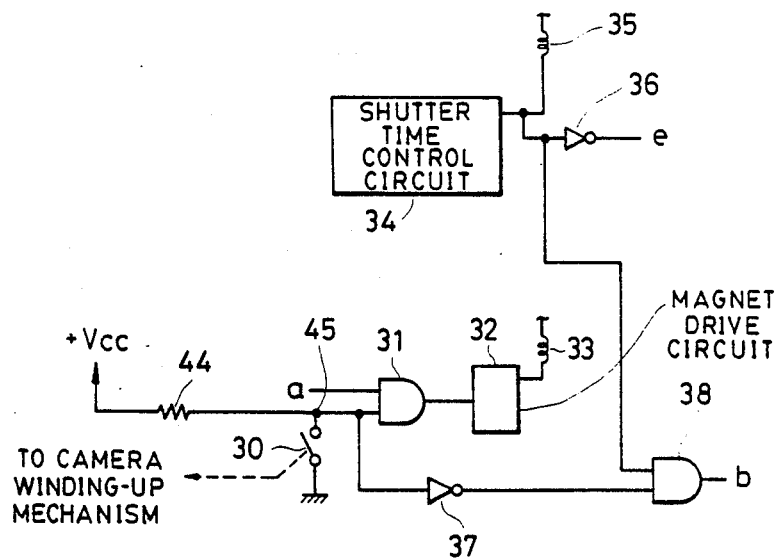
FIG. 4 is a circuit and block diagram of an example of the control circuit shown in FIG. 2.

FIG. 4 is a circuit and block diagram showing an example of the control circuit 24 shown in FIG. 2. As shown in this Figure, a switch 30 is operatively connected to the rear curtain of the shutter (not shown) which opens and closes the aperture 4 (FIG. 1) to expose the camera film for picture taking. The switch 30 is closed in response to aperture closing movement of the rear curtain and is opened upon completion of charging or resetting of the rear curtain. The switch 30 and a resistor 44 are connected in series between ground and a positive voltage +Vcc. An AND gate 31 is connected to receive signals from the input a and a junction 45 between the resistor 44 and the switch 30. The AND gate 31 delivers a signal of "H" level when the switch 30 is opened while the trigger switch 26 (see FIG. 2) is closed and applies an "H" level to the input a. Therefore, the gate 31 delivers a signal of "H" level in response to each completion of camera windup, as long as the trigger switch 26 is closed, i.e., as long as the camera shutter button 6 is depressed.

The control circuit 24 further includes a magnet drive circuit 32 which actuates an electro-magnet 33 in response to the signal of "H" level derived from the AND gate 31. The electro-magnet 33, when energized, releases a shutter opening curtain in the camera to open the aperture 4 and expose the film to a picture image. It will be seen that with this arrangement the shutter release is executed automatically after each completion of film winding as long as the camera shutter release button 6 remains depressed so that the object being photographed is shot repeatedly and continuously.

A shutter time control circuit 34 starts a timing operation when the front curtain of the shutter begins to open the camera aperture 4 in response to the shutter releasing operation of the magnet 33; and the time control circuit 34 changes the level of its output from "L" to "H" after a predetermined shutter time has elapsed. An electro-magnet 35 is arranged to release the rear curtain of the camera shutter in response to the change in the level of the output of the time control circuit 34 from "L" to "H". The shutter time control circuit 34 changes the level of its output from "H" to "L" after the releasing operation. An inverter 36 which is connected to the shutter time control circuit 34 produces at its output e an "H" level during the picture taking exposure, i.e., when the camera aperture is opened.

An inverter 37 is connected between the junction and one input of an AND gate 38. The other input of the AND gate 38 is connected to the output of the shutter time control circuit 34. The AND gate 38 maintains its output at "H" level from the completion of each picture taking exposure until the completion of the following camera wind-up operation.

Figure 3:
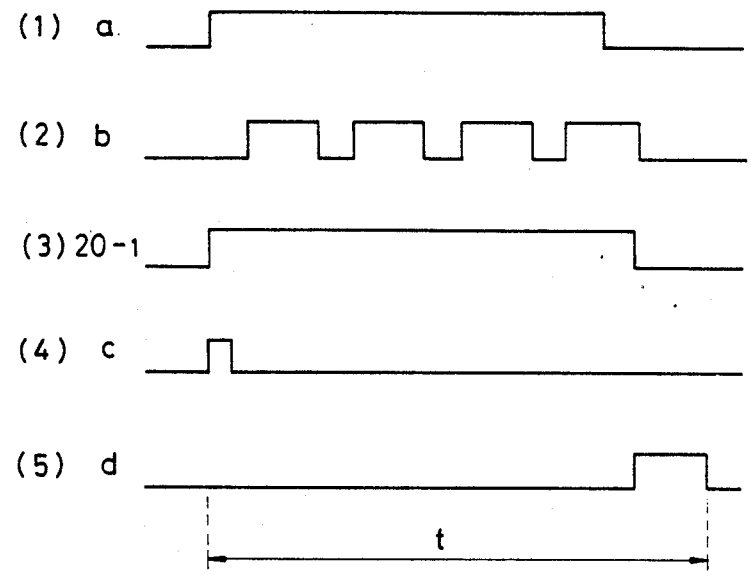
FIG. 3 is a waveform chart illustrating the operation of the circuit shown in FIG. 2.

In operation, the user first depresses the release button 6 to close the switch 26 so that the level at the input a of the camera control circuit 24 is changed to "H" as illustrated at (1) in FIG. 3, so that the control circuit 24 performs its shutter front curtain releasing operation to open the camera aperture 4 for picture taking. At the same time, one of the inputs of the NOR gate 27 is changed to "H" to turn off the transistor 29 and generate a signal of "H" level at the contact 20-1. This in turn activates the monostable multivibrator 9 so that it applies an "H" level signal to the the input c of data processing circuit 13 for a predetermined time, whereby the shooting data applied to the LCD 15 is latched.

Then, the picture taking exposure is begun immediately after the shutter front curtain releasing operation and, after the completion of the picture taking exposure, the output b of the control circuit 24 is changed to "H"

level, so that the transistor 23 is turned on to activate the motor 22 which in turn performs a camera wind-up operation (which includes positioning a new film frame over a camera aperture 4), thus completing one cycle of sequential operation of the camera. The switch 30 is opened when the camera wind-up is completed. If the switch 26 is still on after the completion of the wind-up operation, the signal inputted to the input a of the control circuit 24 is held at the "H" level, so that the control circuit 24 re-starts the releasing operation in response to this signal of "H" level and the winding completion signal.

Thus, the control circuit 24 operates to repeat a series of shooting or picture taking exposure cycles, each cycle including shutter releasing, picture taking exposure and camera wind-up.

When the user releases the shutter release button 6 during the repetition of the shooting exposure cycles, the switch 26 is opened so that the level of the signal inputted to the input a of the control circuit 24 is changed to "L", whereby repetition of the shooting exposure or picture taking cycles is stopped. Thus, as the completion of the camera wind-up operation, all the inputs of the NOR gate 27 are changed to "L", so that the transistor 29 is turned on, thereby changing the level of the signal at the contact 20-1 from "H" to "L". As a result, the multivibrator 10 operates to produce at its output an "H" level signal for a predetermined time as shown at (5) in FIG. 3, so that the transistor 14 is in its conductive state for that predetermined time so as to light the lamp 16, whereby the data on the LCD 15, i.e., the data obtained at the moment of depression of the shutter release button is recorded in the portion of the film (not shown) after the last one of a series of frames exposed and advanced in consecutive picture taking shots. Since the transistor 12 is conductive during recording of the data, the motor 22 is inhibited from operation and, hence, the film is not moved, thereby ensuring safe recording of data on the film.

After the completion of the data recording, the level of the signal inputted to the input d of the data processing circuit 13 is changed from "H" to "L", so that the circuit 13 is unlatched.

In the event of a single shot, the depression of the shutter release button 6 can be cancelled before the completion of each shooting exposure or picture taking cycle, i.e., before the completion of the camera wind-up operation after a single shooting exposure or picture taking cycle. Therefore, the transistor 29 is turned on each time the single shooting or picture taking cycle is completed, i.e., when the winding is completed, whereby the vibrator 10 operates upon completion of each picture taking cycle, whereby the shooting data is recorded after each single picture.

In a modification, the control circuit 24 may be equipped with a single shot control circuit for the motor 22 which may be arranged to operate the motor 22 only one time for each depression of the shutter release button 6.

As has been described, according to the invention, the data is recorded only in the final one of successive frames which have been exposed in automatic consecutive exposure. Therefore, high-speed consecutive shooting exposure can be started without delay after the depression of the shutter release button and the exposure data is conducted without fail after the completion of automatic consecutive exposure.

In the embodiment described hereinbefore, the latching of the data to be recorded is conducted when the shutter release button 6 is depressed. This, however, is not exclusive and the latching of the shooting data to be recorded may be conducted in synchronization with the start of the shooting or picture taking. The arrangement may be also such that the latching of the data to be recorded is conducted in response to the generation of the signal of "H" level from the control circuit 24, so that the data is latched in response to each releasing operation and, in the case of automatic consecutive shots, the data obtained after the completion of the consecutive shots is recorded on the film.

Although in the described embodiment the data recording device is constructed as part of the camera, the data recording device may be constructed as a unit separate from the camera. The use of an LCD type display also is not exclusive and the display may be constituted by light-emitting elements such as LEDs.

If the wind-up unit 5 is not used, the film wind-up can be performed through a manual wind-up lever 43 (FIG. 1); and, in this case, the data recording is performed after the completion of the film winding up by the lever 43.

What is claimed is:

1. A camera for recording picture images and data images on a film comprising:
   (a) first recording means for recording a picture image on a selected part of the film;
   (b) second recording means for recording a data image on a portion of the film;
   (c) manually operable trigger means; and
   (d) control means responsive to said trigger means for controlling said first and said second recording means, said control means being arranged to cause operation of said first recording means and to prevent operation of said second recording means while said trigger means is operated.

2. A camera ccording to claim 1, wherein said control means is arranged to prevent operation of said first recording means during operation of said second recording means.

3. A camera according to claim 1, wherein said first recording means includes means for advancing film in said camera following recording of a picture image on a selected part of said film and wherein said control means is constructed to operate said second recording means in response to termination of operation of said means for advancing film following operation of said trigger means.

4. A camera according to claim 3, wherein said control means is arranged to prevent operation of said means for advancing film during operation of said second recording means.

5. A camera according to claim 3, wherein said second recording means includes data processing means and data light generating means for generating data light based on processed data and for causing the film to be exposed to the data light.

6. A camera according to claim 5, wherein said control means is arranged to operate at least said data light generating means when said means for advancing film has completed the film advancing and the operation of said trigger means has been released.

7. A camera according to claim 6, wherein said means for advancing film is of a motor driven type and includes a motor; and wherein said control means is further arranged to sequentially operate a shutter on said camera and said means for advancing film and terminate the controlling after said means for advancing film has completed film advance when the operation of said trigger means is released.

8. A camera comprising:
(a) a manually operable trigger button;
(b) a shutter for exposing a film to a picture image;
(c) a motor for winding up the film;
(d) a data light generator for causing the film to be exposed to data light; and
(e) a control circuit responsive to said trigger button to control said shutter, said motor and said data light generator, said control circuit being arranged to sequentially operate the shutter and the motor as long as the trigger button is operated and to operate the data light generator when the operation of the trigger button is released and the motor has completed the film winding up.

9. A camera according to claim 8, wherein said data light generator is located beyond an aperture of said camera in the direction of film winding to expose a frame of said film to data light following exposure of said frame to a picture image.

* * * * *

UNITED STATES PATENT AND TRADEMARK OFFICE
CERTIFICATE OF CORRECTION

PATENT NO. : 4,664,491

DATED : May 12, 1987

INVENTOR(S) : JIRO KAZUMI and MASAAKI ISHIHARA

It is certified that error appears in the above-identified patent and that said Letters Patent is hereby corrected as shown below:

Column 2, line 17, "Accoding" to read -- According --;

Column 2, line 46, "constructions" to read -- construction --;

Column 5, line 53, "vibrator" to read -- multivibrator.

Signed and Sealed this

Twenty-fifth Day of August, 1987

*Attest:*

DONALD J. QUIGG

*Attesting Officer*  *Commissioner of Patents and Trademarks*